United States Patent [19]

Jardin

[11] Patent Number: 4,946,225
[45] Date of Patent: Aug. 7, 1990

[54] VEHICLE ROOF

[75] Inventor: Hans Jardin, Inning, Fed. Rep. of Germany

[73] Assignee: Webasto AG Fahrzeugtechnik, Gauting, Fed. Rep. of Germany

[21] Appl. No.: 232,175

[22] Filed: Aug. 15, 1988

[30] Foreign Application Priority Data

Aug. 20, 1987 [DE] Fed. Rep. of Germany ....... 3727722

[51] Int. Cl.⁵ .............................................. B60J 7/00
[52] U.S. Cl. .................................. 296/213; 296/214; 296/216; 248/188.2
[58] Field of Search ............... 296/213, 214, 216, 220, 296/221–223; 248/650, 656, 188.2

[56] References Cited

U.S. PATENT DOCUMENTS

| | | | |
|---|---|---|---|
| 2,463,754 | 3/1949 | Deters | 248/188.2 |
| 4,293,161 | 10/1981 | Lutz | 296/213 |
| 4,320,921 | 3/1982 | Schatzler | 296/214 X |
| 4,332,416 | 6/1982 | Lutz et al. | 296/216 |
| 4,337,974 | 7/1982 | Kohlpaintner et al. | 296/214 |
| 4,671,565 | 6/1987 | Grimm et al. | 296/216 |
| 4,749,227 | 6/1988 | Bienert et al. | 296/222 X |

FOREIGN PATENT DOCUMENTS

| | | |
|---|---|---|
| 1282481 | 11/1968 | Fed. Rep. of Germany ...... 296/222 |
| 1505282 | 8/1969 | Fed. Rep. of Germany ...... 296/222 |
| 2037379 | 1/1972 | Fed. Rep. of Germany ...... 248/656 |
| 3221487 | 12/1983 | Fed. Rep. of Germany . |
| 2024114 | 1/1980 | United Kingdom ................ 296/222 |
| 2123358 | 2/1984 | United Kingdom . |
| 2174047 | 4/1985 | United Kingdom . |
| 2178478 | 7/1985 | United Kingdom . |
| 2180295 | 3/1987 | United Kingdom . |

Primary Examiner—Dennis H. Pedder
Attorney, Agent, or Firm—Sixbey, Friedman, Leedom & Ferguson

[57] ABSTRACT

A vehicle roof with a roof opening is provided in a fixed roof area that can be closed by a closure panel, which is slidable on tracks and/or may also be raised at its rearward edge, wherein an actuating device, provided to drive the closure panel, and the tracks for the closure panel are unified into an installation unit attached to the fixed roof area bordering the roof opening. The installation unit can be attached directly to the roof opening by connecting brackets that may be attachment flanges or the like, or by a frame, mounted to or formed by the fixed roof area bordering the perimeter of the roof opening. A water drainage device may be provided that is formed from the fixed interior headliner or may be a separate water-collecting basin carried by the interior headliner. If a slidable interior headliner is provided, the tracks can be formed directly on the fixed interior headliner or may be constructed on the water-collecting basin, if such a basin is provided. Vertical adjustment devices are provided to adjust the height of the installation unit relative to the fixed roof area and, in certain cases, the slidable interior headliner as well.

20 Claims, 5 Drawing Sheets

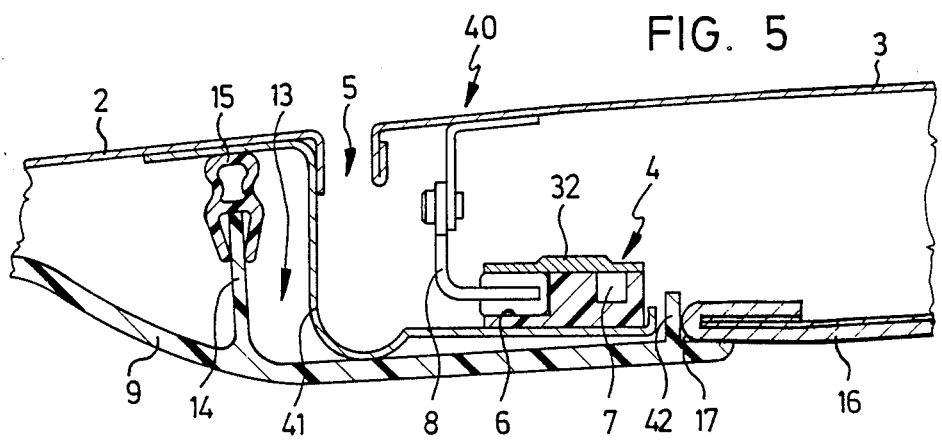
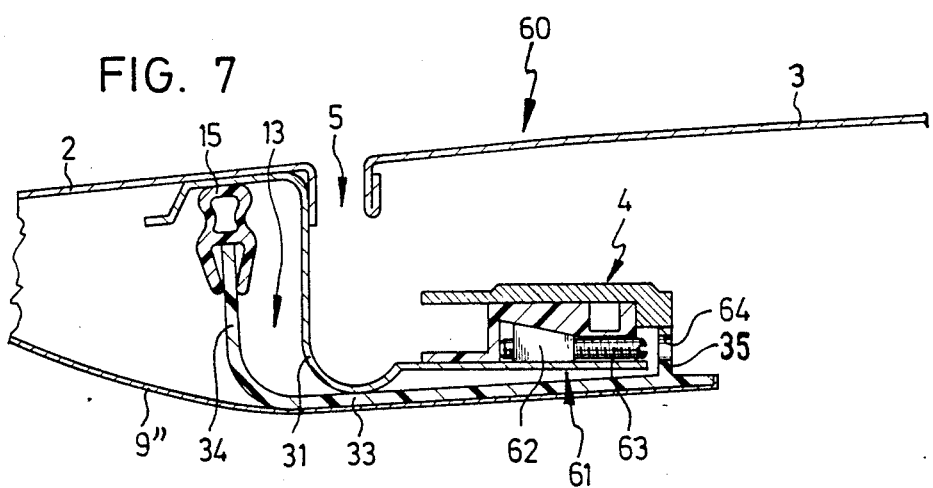
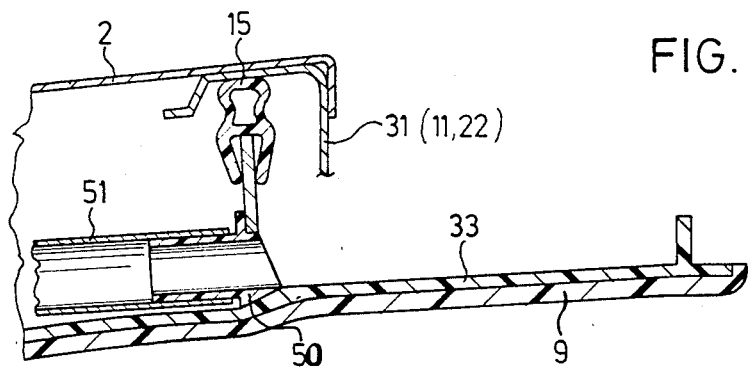

VEHICLE ROOF

BACKGROUND OF THE INVENTION

The invention relates to a vehicle roof with an aperture provided in a fixed roof area that can be closed by a closure panel, which is slidable on tracks and/or may also be raised at its rearward edge, wherein an actuating device is provided to drive the closure panel, and an interior roof covering, designed as a fixed interior headliner, is provided, in addition to a water drainage device.

A vehicle roof of the above-mentioned type is known from U.S. Pat. No. 4,293,161. A frame consisting of plastic is disclosed which, on the one hand, has the tracks in the form of sliding surfaces and, on the other hand, has guide channels for the actuating cable of the actuating device. The underside of the frame facing the inside of the vehicle at least partially forms the inside roof lining. The frame is preferably made in one piece from plastic and borders a drip molding in the area of the front edge and the lateral edge of the roof opening. The frame is fastened to an inside panel provided for reinforcement in the area of the roof opening. The plastic frame provides a vertical wall portion raised into close proximity with the outer roof panel and the rim of this wall is in contact with the outer roof panel by way of a gasket. Therefore, the vehicle roof of this patent has a relatively large overall height and, in particular, assembly is very expensive, because several frame parts have to be mounted to the fixed roof area. Further, the roof opening, in its entire width from lateral edge to lateral edge, is reduced due to the placement of the functional components for displacement of the cover panel in this area and the manner of their integration with the plastic frame. In addition, expensive construction is also required due to the design of the disclosed vehicle roof.

U.S. Pat. No. 4,671,565 discloses a cable guide arrangement for motor vehicle sliding roofs comprising three guide components equipped with cable guide channels having an identical cross-section shape, which are formed into a U-shaped guide frame. This guide frame, which consists of three parts, is shaped in such a way that an outwardly projecting attachment flange is provided, to which a rib of a sliding roof frame bordering on a water channel can be attached. Further, clamping shapes for mounting an inside roof lining are present. Thus, two frame parts, a sliding roof frame and a guide frame, consisting of three parts, are provided, so that a costly assembly is necessary and the parts with close tolerances must be coordinated with each other.

SUMMARY OF THE INVENTION

In order to overcome the previously described difficulties, it is an object of the invention to provide a vehicle roof, of the general type initially mentioned, that can be easily produced, can be assembled simply, and will allow as large a roof opening as possible.

These objects and others are achieved, in accordance with preferred embodiments of the invention, by a vehicle roof of the general type previously described with its tracks and actuating device combined into an installation unit attached to the roof opening, and a water drainage device formed from the interior headliner and/or a water-collecting basin.

In the vehicle roof according to the invention, the mechanical movement apparatus with tracks and the like are combined into a fully functional installation unit that can be attached separately to the roof opening, while its water-conveying area with water drainage device is designed completely separately. Thus, the area formed by the installation unit can be reduced, allowing for an increase in the width of the aperture, and thus making possible a larger roof opening in the vehicle roof. Further, the water drainage device, which constitutes the water-conveying area in the vehicle roof according to the invention, can be designed and mounted independently of the installation unit, resulting in an area as large as possible being available. If, for example, the interior headlining is designed as a fixed interior headliner, it directly forms the water drainage device, preferably by being formed from a single piece water-collecting basin, or the like, so that no additional water troughs or water channels are needed. If, on the other hand, the interior headliner is formed by a stretched fabric held to the fixed roof under tension, a water-collecting basin for water drainage is provided that can suitably be produced from an inexpensive plastic material. Water-collecting basin pipes, in the area of the front edge and the rear edge of the roof opening are sufficient so that they can be designed and installed in a space-saving and material-saving way. Alternatively, a fixed interior headliner and a separately manufactured water-collecting basin or the like can be provided, in which the fixed interior headliner and the water-collecting basin are connected, glued, for example, in a suitable manner.

Preferably, the installation unit is attached to the roof opening, with an intermediate element, by a frame mounted to the fixed roof area, along the perimeter of the roof opening, extending only over the cutout area. When it is not suitable, for reasons of shaping technique and sturdiness, to attach the installation unit directly to the roof area of the roof opening by brackets or flanges or similar parts, or such a fastening entails too great an expenditure, a separate frame can be used. According to this embodiment, the installation unit can be attached to this separate frame, but which has only the task of a supporting frame and, therefore, extends only over the cutout area of the roof opening.

In an advantageous manner, the installation unit is either fastened directly to the roof area of the roof opening by connecting brackets and/or attachment flanges or, alternatively, with an intermediate element, to the frame mounted to the fixed roof area, along the perimeter of the roof opening. In this case, the mounting can advantageously be selected to provide for vertical adjustment of the installation unit for alignment of the closure panel with the fixed roof.

In the vehicle roof according to the present invention, support structure of the installation unit can be manufactured of resilient extruded material, which is both inexpensive and easy to mold. This material can be utilized because the functional unit is designed with a reduction in width and, therefore, can be manufactured from a material with thin walls. The support structure of the installation unit is comprised of plastic molded parts, preferably parts of sheet molding compounds (SMC) i.e., polyester resin impregnated glass fibers for compression molding. As a result, an additional saving of weight is achieved and the functional unit forms a closed body.

For simplified attachment of the installation unit to the roof opening, connecting brackets or attachment flanges are provided on the shaped material of the plastic molded parts or, preferably, are formed directly on these parts.

In the vehicle roof according to the invention, to delimit the water-conducting area in the vehicle roof, a continuous gasket is provided between the fixed roof area and the interior headliner, when the latter specifically forms the water drainage device, or the water-collecting basin. In this case, the layout is preferably such that this continuous gasket is supported by the inside roof lining or the collecting basin, so that the construction of the fixed roof area need not be changed.

The water drainage device in the vehicle roof according to the invention, preferably, comprises water drains that are formed on or embedded in appropriate areas. If the water drainage device is formed by water-collecting basins, for example, the water drains are suitably formed on the corners. On the other hand, if the water drainage device is formed by the interior headliner, the water drains are suitably embedded at appropriate places. The water drains can also be formed by parts of pipes, hoses or the like that are inserted in the water drainage device. If the inside roof lining directly forms the water drainage device, it is preferably reinforced in the area of the water drains.

In accordance with another aspect of the present invention, a vehicle roof is provided with a slidable interior headliner that covers the underside of the closure panel, and which is displacable along guides relative to the closure panel. According to an advantageous design of the vehicle roof that is shared with the roof of my co-pending U.S. patent application Ser. No. 232,174 filed on even date herewith the guides for the slidable interior headliner are provided on the fixed interior headliner. Therefore, the guides for the slidable interior headliner are completely separated from the installation unit and the guides for the closure panel and actuating device. As a result, the slidable interior headliner can be moved independently of the installation unit for the closure panel closing the roof opening. In addition, the slidable interior headliner is movable independently of the vertical adjustment of the installation unit. Therefore, the operability and functionality of the slidable interior headliner is independent of the functioning of the closure panel and can be separately adjusted due to its ability to function independently of the closure panel. At the same time, the slidable interior headliner can be color coordinated appropriately with the fixed interior headliner so that an attractive total optical impression is obtained in the interior space of the vehicle.

According to a preferred embodiment, the guides for the slidable interior headliner are formed on the fixed interior headliner. Alternatively, the guides for the slidable interior headliner can be formed separately from the fixed interior headliner and attached to it. In such a design, it is especially suitable to make the guides for the slidable interior headliner vertically adjustable, to allow for resetting the alignment of the slidable interior headliner and the fixed interior headliner.

Further, the guides for the slidable interior headliner function as a partition for the water-conveying area, which is formed by the water drainage device. As a result, an overflow of water from the water drainage device into the interior space through the roof opening can be effectively prevented.

In accordance with another aspect of the present invention, a vertical adjustment device is provided for the installation unit. An adjustment element, that works together with the fixed roof area and the frame that is optionally provided, allows adjustment of the height of the installation unit so that a reliable operation of the actuating device and a correspondingly reliable guiding of the closure panel are guaranteed.

In the preferred embodiment of the vehicle roof, the adjustment element of the vertical adjustment device is constructed in a wedge-shaped design and is preferably slidable longitudinally by an adjusting screw. The wedge-shaped adjustment element can be moved by appropriate turning of the adjusting screw, so that the functional unit assumes its predetermined position in relation to the fixed roof area.

In an alternative embodiment of the vehicle roof, a vertical adjustment device with an adjusting element constructed in a disk-shaped design is provided. The surface of the disk shape that works together with the installation unit is a progressively ascending spiral-shaped surface. By appropriate turning of an adjustment element, for which the adjustment element suitably has a tool plug-in part, the height of the installation unit can be Continuously controlled. To avoid unintentional loosening of the height of the installation unit, the surface of the vertical adjustment device is roughened, corrugated, or the like, so that, as a result of frictional engagement, the adjusting element remains in its position once it has been set. Appropriate markings that are assigned to predetermined heights can be provided on the outer circumference of the adjustment element. Numerical values can be assigned to these markings, so that, for example, predetermined height settings on a millimeter scale corresponding to the ascending slope of the progressive shape of the surface can be carried out.

The vertical adjustment devices provided, according to the invention, are mounted at several places in the path of the functional unit. Preferably, a vertical adjustment device should be mounted at each corner area of the functional unit. Thus, four vertically adjustable bearing surfaces, distributed regularly over the perimeter of the functional unit, are provided. As a result, the functional unit can be adjusted reliably to the desired height.

These and further objects, features, and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 5 is a diagrammatic sectional view of a modified design of the embodiment according to FIG. 4;

FIG. 6 shows a diagrammatic view illustrating further details of a water drainage device of the vehicle roof according to the invention;

FIG. 7 shows a diagrammatic sectional view of an embodiment of a vehicle roof with a vertical adjustment device.

In the figures of the drawings the same or similar parts are provided with the same reference symbols, with indicators 10, 20, 30 and 40 being assigned to the various embodiments according to FIGS. 2 to 5.

DETAILED DESCRIPTION OF THE PREFERRED EMBODIMENTS

Figure 1:
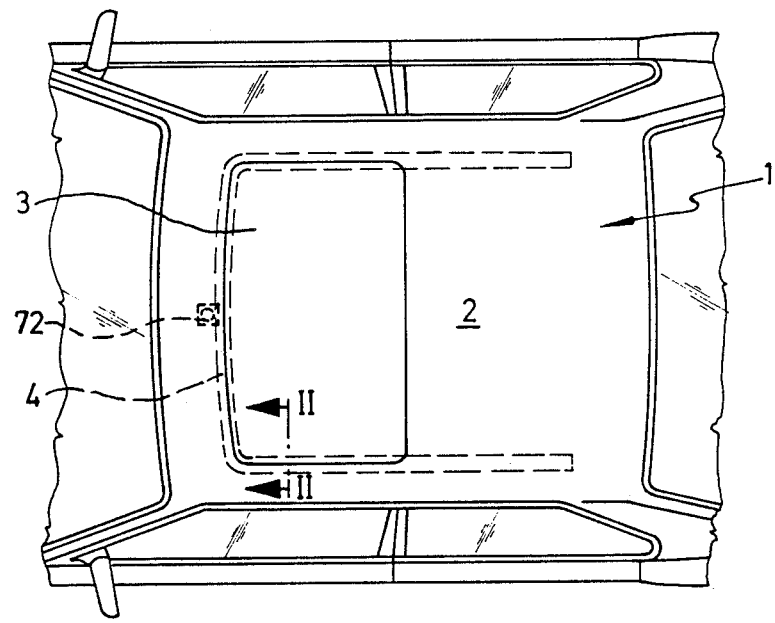
FIG. 1 is a diagrammatic top view of the vehicle roof of the present invention.

A vehicle roof designated, generally, with 1, can be seen in FIG. 1 in top view. In a fixed roof area 2, a roof opening, not more precisely indicated, is provided that is closed, in the example shown in FIG. 1, by a closure panel 3. A fully functional installation unit 4 comprises tracks and an actuating device to move closure panel 3. Closure panel 3 is slidable or may, optionally, be tiltably raised at the rearward edge thereabove, as well. The sliding and lifting mechanism of the closure panel is of conventional design (see, for example, U.S. Pat. No. 4,332,416) and, thus, the details thereof need not be described more fully.

Figure 2:
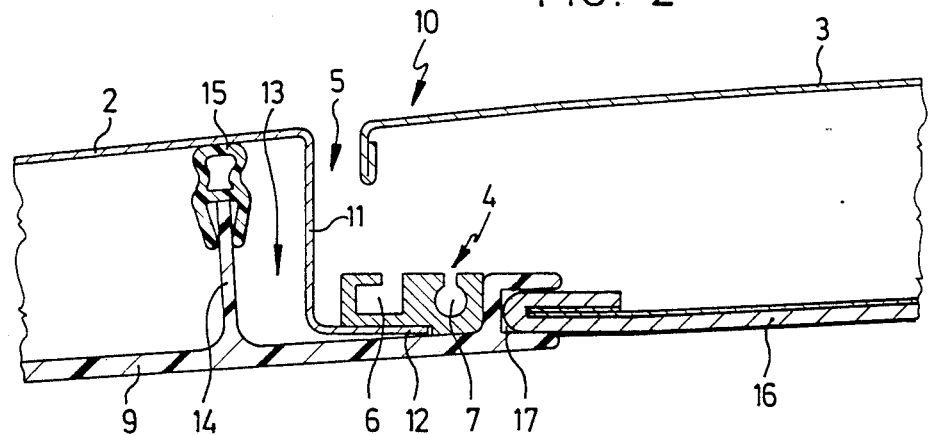
FIG. 2 is a diagrammatic sectional view of a first embodiment of a vehicle roof according to the invention taken along line II—II of FIG. 1.

According to FIG. 2, vehicle roof 10 has a fixed roof area 2 that borders a roof opening 5. The edge of fixed roof area 2 bordering roof opening 5 has a downwardly bent section 11 and an inwardly bent section 12 that is constructed in one piece with fixed roof area 2 to form a support frame that serves as an attachment means for the installation unit. Mounted on section 12 of fixed roof area 2, which is perpendicular to section 11, is installation unit 4, which comprises, in part, a guide member having a track 6 and a track channel 7 for an actuating cable of an actuating device 72, shown mounted in the area of the front edge of the roof opening in FIG. 1. Also indicated as part of the installation unit, in the following examples, is a guide element, not shown in detail in FIG. 2, to which the closure panel 3 is attached for movement in track 6. The interior of vehicle roof 10 is covered by interior headlining.

The interior headlining of this preferred embodiment comprises a fixed interior roof headliner 9 and a sliding interior roof headliner 16. In the embodiment according to FIG. 2, the fixed interior headliner 9 directly constitutes a water drainage device 13. Further, a rib shaped, projecting web 14 is constructed on fixed interior headliner 9 and forms a vertical wall portion that extends into close proximity with fixed roof area 2 and has a continuous gasket 15 mounted on its rim at its free end. This continuous gasket rests against the underside of fixed roof area 2 and delimits the area of vehicle roof 10, across which water can be conducted from roof opening 5. Although not shown here, water drains are formed on fixed interior headliner 9, or embedded in it, at appropriate places to provide for Water drainage, as described relative to FIG. 6, below. For example, hoses, or the like, can be used for this purpose.

Further, in the embodiment according to FIG. 2, vehicle roof 10 has a slidable interior headliner 16 in the area of roof opening 5 that covers the underside of closure panel 3 and is slidable along guides 17. In the embodiment of vehicle roof 10 according to FIG. 2, guides 17 for sliding the interior headliner 16 are formed on the fixed interior headliner 9. Guides 17 also function as a partition for water drainage device 13 by forming a vertical wall portion which prevents penetration of water into the passenger compartment by way of roof opening 5, when closure panel 3 is open, or, optionally, by way of slidable interior headliner 16.

Although not shown, guides 17 for slidable interior headliner 16 can also be designed as parts that are separate from fixed interior headliner 9 and that can be attached to fixed interior headliner 9 or to a side of installation unit 4. In such an embodiment, slidable interior headliner 16 would be vertically adjustable, making it possible to line up slidable interior headliner guides 17 independently of installation unit 4.

Figure 3:
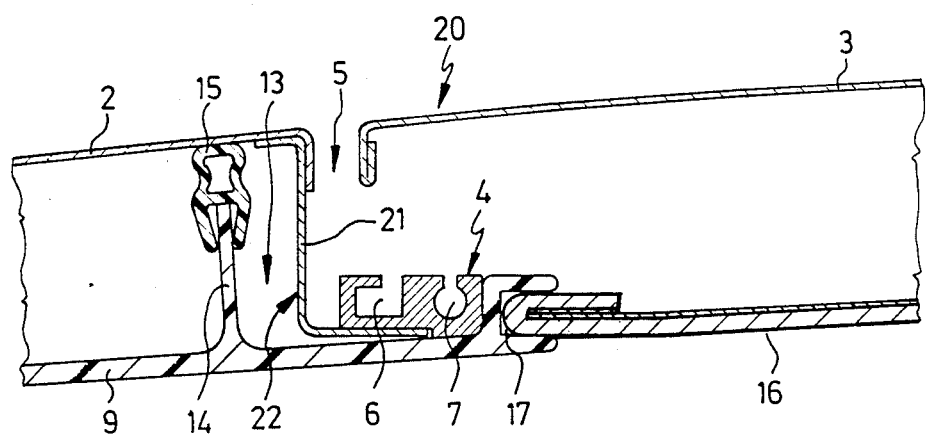
FIG. 3 is a diagrammatic sectional view of a first embodiment of a vehicle roof according to the invention taken along line II—II of FIG. 1.

In FIG. 3, an alternative design of the vehicle roof as a whole is identified as 20. In this embodiment, several connecting brackets 21, serving the function of bent sections 11, 12 in FIG. 2, are provided which are mounted, by welding or with bolts, to fixed roof area 2 along the perimeter of the roof opening 5 and form an attachment means for supporting installation unit 4 from below. Connecting brackets 21 may be attachment flanges in the form of fastening parts that are, e.g., Z-shaped, bent, bracket-like parts, and, of course, several such fastening parts 21 are placed along the edge of the circumference of roof opening 5 at appropriate intervals to form a frame-like supporting arrangement designated 22, as a whole, in FIG. 3. The construction of water drainage device 13, slidable interior headliner 16 and guides 17 coincide, with the details that have been explained above in connection with FIG. 2.

Figure 4:
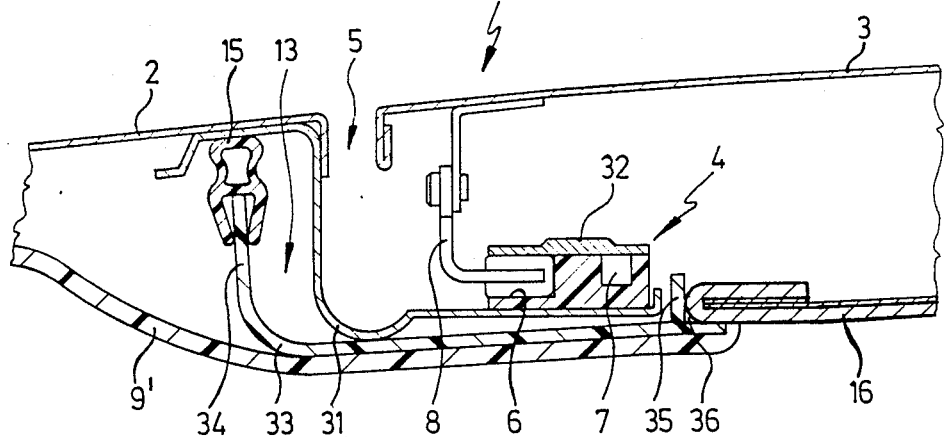
FIG. 4 is a diagrammatic sectional view of another aspect of the vehicle roof of the present invention taken along line II—II of FIG. 1 with a frame mounted to the fixed roof area, along the perimeter of the roof opening.

In FIG. 4, an embodiment is shown of a vehicle roof identified, in its entirety, as 30, in which a frame 31 is mounted to the fixed roof area 2, along the perimeter of the roof opening. Frame 31 extends only over the cut-out area of the roof opening and thus, differs from the conventional supporting frames used in such vehicle roofs which extend a considerable distance, in a lengthwise direction, rearwardly of the aperture 5 of the vehicle the roof 30 (see frame 4 of U.S. Pat. No. 4,332,416, for example). This frame 31 is attached to fixed roof area 2 in any suitable way, and fixed roof area 2 is, preferably, directed downward to delimit roof opening 5. Also, frame 31 serves as an attachment means for the installation unit 4, which rests on the lower inner free end of frame 31 and is fastened to it. In this case, installation unit 4 is constructed, in part, of plastic molded parts that are, preferably, produced from sheet molding compound (SMC). For example, track 6 and track channel 7 for the actuating cable are formed in a guide member made of plastic. However, this plastic member is provided with a covering 32 that, in the example that is shown, consists of metal. As an alternative, however, this covering 32 can also be made of plastic. A guide element 8 that is connected with closure panel 3 runs in track 6. The actuating cable running in guide channel 7 is not shown.

In the embodiment according to FIG. 4, a water-collecting basin 33 is provided, as a water drainage device 13, that has a vertical wall portion with rim 34 upon which continuous gasket 15 is attached. In this case, continuous gasket 15 works together with the underside of frame 31. Water-collecting basin 33 can be formed of a continuous plastic part extending around the entire roof opening 5, or water-collecting basin parts can be arranged only in the area of the front or the rear of roof opening 5. Water-collecting basin 33, or the water-collecting basin parts, are suitably made of plastic. In the example that is shown, the water-collecting basin 33 is attached to the top surface of fixed interior headlining, between the fixed roof area 2 and fixed interior headliner 9'. Of course, a water-collecting basin 33 shown in FIG. 4 or appropriate collecting basin parts can also be used in the embodiments of vehicle roof 10 or 20 according to FIGS. 2 and 3. As a result, no projecting web 14 needs to be provided on fixed interior headliner 9' for supporting a sealing gasket since the headliner 9', in such a case, does not serve as a water drainage device.

At its end directed inwardly toward the center of roof opening 5, water-collecting basin 33 has another vertical wall portion 35, which functions in connection with fixed interior headliner 9', as a guide 36 for slidable interior headliner 16. Since guide 36 for slidable interior headliner 16 is constructed directly on water-collecting basin 33, its vertical wall portion 35 serves, simultaneously, as a water retaining partition for the water-conveying area that is formed by the water-collecting basin 33.

In FIG. 5, an alternative construction of a vehicle roof designated, in its entirety, as 40, is shown. The essential difference from the embodiment of FIG. 4 is that a water-collecting basin 33 is replaced with a water drainage device 33, formed directly from fixed interior headliner 9, similar to the examples according to FIGS. 2 and 3. As with the embodiment shown in FIGS. 2 and 3, the fixed interior headliner 9 has a vertical wall portion 14 with a continuous gasket 15 mounted on its rim, which works together with a frame 41 that is mounted to the fixed roof area 2 along the perimeter of roof opening 5 and serves as an attachment means for installation unit 4. In this case, guide 17 for slidable interior headliner 16 is constructed directly on fixed interior headliner 9 and a vertical wall portion 42 is provided which functions both as a guide for the slidable interior headliner and as a water partition for the water-conveying area of water drainage device 13. Here, as in FIGS. 2 and 3, appropriate water drains can be formed on or embedded in the headliner, for which purpose pipe parts, hoses, or the like, are used.

In FIG. 6, for example, water drainage device 13 is formed of a collecting basin 33 or collecting basin parts. Pipe parts 50 are attached to water-collecting basin 33 in the corner areas, which constitute the most deeply located water-conveying area of water drainage device 13. Alternatively, pipe parts 50 can be formed as an integral part of the corner areas. A hose or pipe 51 is attached to pipe part 50, shown in FIG. 6. The water collected by the water-conveying area is then drained off from collecting basin 33 by way of hose 51. Of course, similar water drains can also be provided for the embodiments in which fixed interior headliner 9 is designed as a water-conveying area. Otherwise, FIG. 6 corresponds essentially to the embodiment according to FIG. 4 and, for reasons of clarity, the installation unit and sliding inside roof lining 16 have been omitted.

In FIG. 7, an embodiment of a vehicle roof identified in its entirety, as 60, is shown. As in the example of vehicle roof 30 according to FIG. 4, a frame 31 is provided which is mounted to the fixed roof area 2 along the outer perimeter of roof opening 5. Water drainage device 13 is formed by water-collecting basin 33, which supports a continuous gasket 15 that contacts the underside of frame 31. In a departure from FIG. 4, however, the fixed headliner may be a stretched interior headliner 9'', that is formed of a fabric, for example. The stretched interior headliner 9'' is fastened to the underside of water-collecting basin 33 and is attached e.g., to the perimeter of the roof under tension.

Further, a vertical adjustment device 61 is provided for installation unit 4. Vertical adjustment device 61, shown in FIG. 7, is attached to frame 31 and comprises a wedge-shaped adjustment element 62 which works together with frame 31 to support installation unit 4. Of course, vertical adjustment device 61 can also be arranged in an alternative design when frame 31 is absent, in which case wedge-shaped adjusting element 62 works together with fixed headliner 9. An adjusting screw 63, accessible through a passage opening 64 in vertical wall portion 35 of water-collecting basin 33, is provided to adjust wedge-shaped adjusting element 62. Adjusting screw 63 can be turned with a tool, such as a screwdriver, to move wedge-shaped adjustment element 62 longitudinally, and, as a result, the height of installation unit 4 changes in relation to frame 31. In this way, installation unit 4 can be vertically adjusted to ensure proper alignment when being installed. Of course, several such vertical adjustment devices 61 can be provided to adjust installation unit 4, preferably placed at its corner areas.

Figure 8:
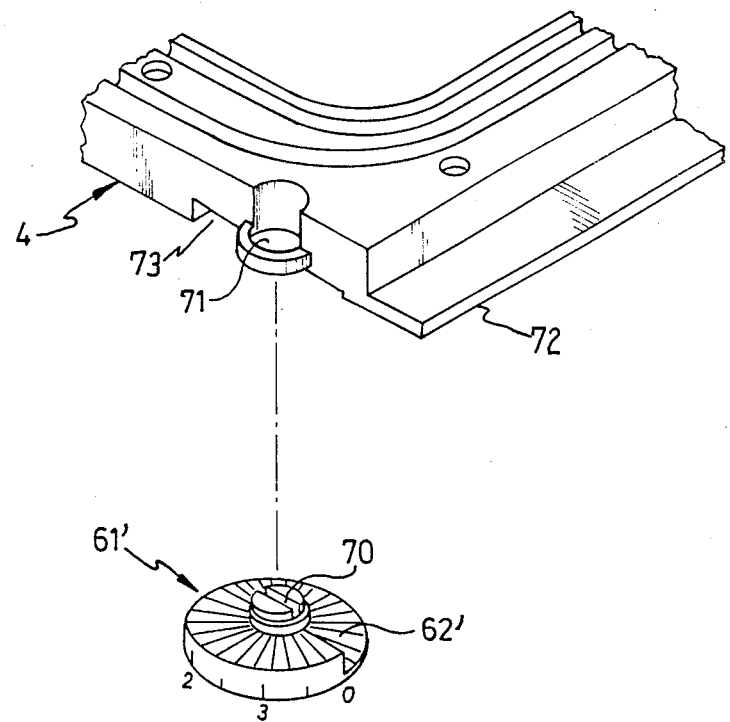
FIG. 8 shows an exploded perspective view of an embodiment of a vehicle roof with an alternative form of construction of a vertical adjustment device.
Figure 9:
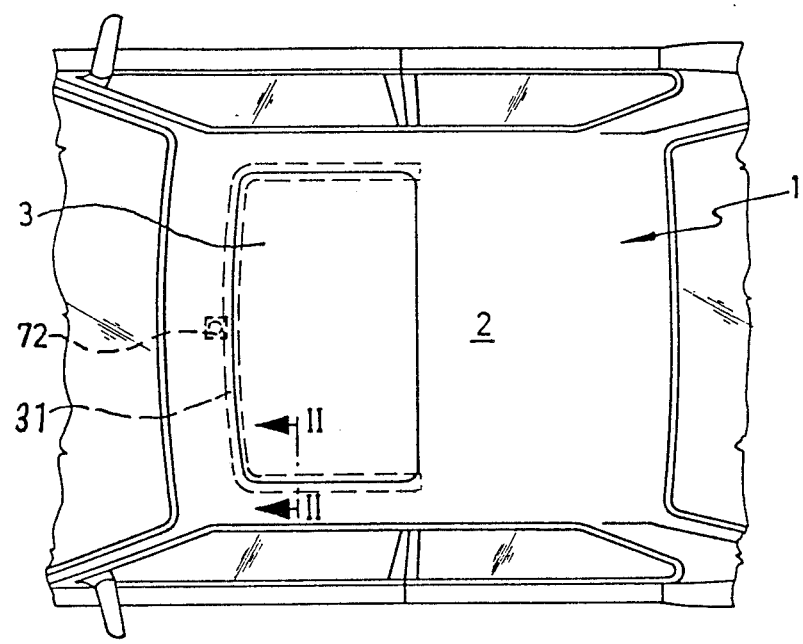
FIG. 9 shows a diagrammatic top view of an embodiment of the present invention showing a frame delimited by the roof opening perimetric area.

In FIG. 8, an alternative design of a vertical adjustment device 61' is shown in a diagrammatic exploded perspective view. In this vertical adjustment device 61' a disk-shaped adjustment element 62' is provided with a surface that has progressively ascending sections. Indicated diagrammatically in the drawing, this surface is roughened and provided, e.g., with corrugations. In the center of disk-shaped adjustment element 62', a plug-in part 70 is provided in which a tool, such as a screwdriver, can be inserted to adjust adjustment element 62'. On the guide member 72 of installation unit 4, a receiving opening 71 is provided. This receiving opening 71 encloses tool plug-in part 70 when it is plugged therein and is mounted to allow rotation of element 62. By appropriate rotation of disk-shaped adjustment element 62', by rotation of a tool inserted in the tool slot of plug-in part 70, the portion of the surface of adjustment element 62' that works together with the guide member 72 of the installation unit 4 can be changed. As a result, installation unit 4 can be adjusted in the vertical direction by increasing or decreasing the thickness of the portion of element 62' that lies in recess 73 at the underside of member 72.

In FIG. 8, markings are provided on the outer circumference of disk-shaped adjustment element 62' to which. e.g., numbers such as 2, 3, 0, and the like, are assigned. Taking into consideration the slope of the surface of disk-shaped adjustment element 62', these markings can be calibrated to correspond to, e.g., with a millimeter scale in elevation. Of course, several such vertical adjustment devices 61' can be suitably placed on the perimeter of installation unit 4. At least four such vertical adjustment devices 61', for example, can be provided, one at each corner of installation unit 4.

While I have shown and described several embodiments in accordance with the present invention, it is understood that the same is not limited thereto, but is susceptible of numerous changes and modifications as known to those skilled in the art. For example, parts of the installation unit 4, such as the guide member, can be produced from a resilient material, although producing installation unit 4 from plastic molded parts, or, preferably, from sheet molding compounds (SMC), is preferred, as the weight of the overall roof construction can, thus, be reduced. Of course, connecting brackets 21 and bracket-like parts 22 or attachment flanges, that serve for attachment to roof opening 5, can also be formed directly on installation unit 4.

Further, other modifications are also possible. For example, a part of the water-conveying area of water drainage device 13 may be in the form of water-collecting basin 33, while another part, is formed directly by fixed headliner 9. Thus, combinations of embodiments of water drainage device 13 that have not been directly reflected in the figures of the drawing are also possible. If for example, no slidable interior headliner 16 is provided on vehicle roof 1, 10, 20, 30, 40, 60, corresponding guides 17 for slidable interior headliner 16 can be omitted. The basic principles of vehicle roof construction according to the invention do not change despite any such modifications described or others that will become apparent to those skilled in the art. As such. I, therefore, do not wish to be limited to the details shown and described herein, but intend to cover all such changes and modifications as are encompassed by the scope of the appended claims.

I claim:

1. Vehicle roof of the type having a fixed roof area with a roof opening formed therein, a closure panel for selectively opening and closing said opening, an installation unit and an interior headliner for covering an interior side of said fixed roof area, wherein said installation unit comprises drive and guide parts including a guide member having a channel for an actuating device and track means for a guide element of the closure panel at each side of the roof opening, and attachment means extending from said installation unit to the fixed roof area for attaching said installation unit to the fixed roof area along the perimetric area of the roof opening, and wherein a water drainage means is provided that is mounted independently of said installation unit and said attachment means, and is positioned below said attachment means in association with said interior headliner.

2. Vehicle roof according to claim 1, wherein said attachment means for attaching the installation unit comprises a frame that is substantially delimited by the perimetric area of the roof opening.

3. Vehicle roof according to claim 1, wherein said attachment means to attach the installation unit to the fixed roof area comprises connecting brackets.

4. Vehicle roof according to claim 1, wherein said guide member is formed of a resilient extruded material.

5. Vehicle roof according to claim 1, wherein said installation unit is comprised of molded parts, said molded parts being formed of a sheet molding compound material.

6. Vehicle roof according to claim 5, wherein said attachment means for attaching the installation unit is formed of bracket-like parts that have a generally Z-shaped cross section.

7. Vehicle roof according to claim 1, wherein a continuous gasket is provided on said drainage means between the fixed roof area and the interior headliner.

8. Vehicle roof according to claim 7, wherein said drainage means is formed by said interior headliner, said interior headliner having a vertical wall portion directed upwardly toward the fixed roof area, said vertical wall portion supporting the continuous gasket.

9. Vehicle roof according to claim 7, wherein said drainage means is formed by a drainage basin carried on said interior headliner, said drainage basin having a vertical wall portion directed upwardly toward the fixed roof area, said vertical wall portion supporting the continuous gasket.

10. Vehicle roof according to claim 1, wherein said water drainage means has a water-collecting area and water drains, for removal of water collected therein.

11. Vehicle roof according to claim 10, wherein said water drainage means comprises a water drainage basin mounted on the interior headliner and said water drains comprise tubes for directing water out of said basin.

12. Vehicle roof according to claim 11, wherein said tubes are integrally joined to said water drainage basin.

13. Vehicle roof according to claim 1, wherein said installation unit is provided with vertical adjustment means for enabling vertical adjustment of the height thereof relative to said fixed roof area.

14. Vehicle roof according to claim 13, wherein said vertical adjustment means comprises an adjusting element acting between said said attachment means and an underside of said guide member.

15. Vehicle roof according to claim 14, wherein said adjusting element is wedge shaped.

16. Vehicle roof according to claim 15, wherein said wedge-shaped adjusting element is displaceable, longitudinally with respect to a direction of inclination a sloping surface thereof, by an adjusting screw.

17. Vehicle roof according to claim 16, wherein said installation unit is provided with an access opening for operation of said adjusting screw.

18. Vehicle roof according to claim 14, wherein said adjusting element is disk-shaped having a top side formed with progressively ascending sections for contacting the underside of the guide member of the installation unit.

19. Vehicle roof according to claim 18, wherein said disk-shaped adjusting element has a plug-in part with a tool reception slot, said plug-in part being rotatably mounted within an access opening that is formed in said guide member of the installation unit.

20. Vehicle roof according to claim 14, wherein a plurality of said vertical adjustment means are provided spaced along the perimeter of the installation unit.

* * * * *